T. H. BISHOP.
COPY HOLDER.
APPLICATION FILED FEB. 16, 1917.
1,262,626.
Patented Apr. 16, 1918.
2 SHEETS—SHEET 1.
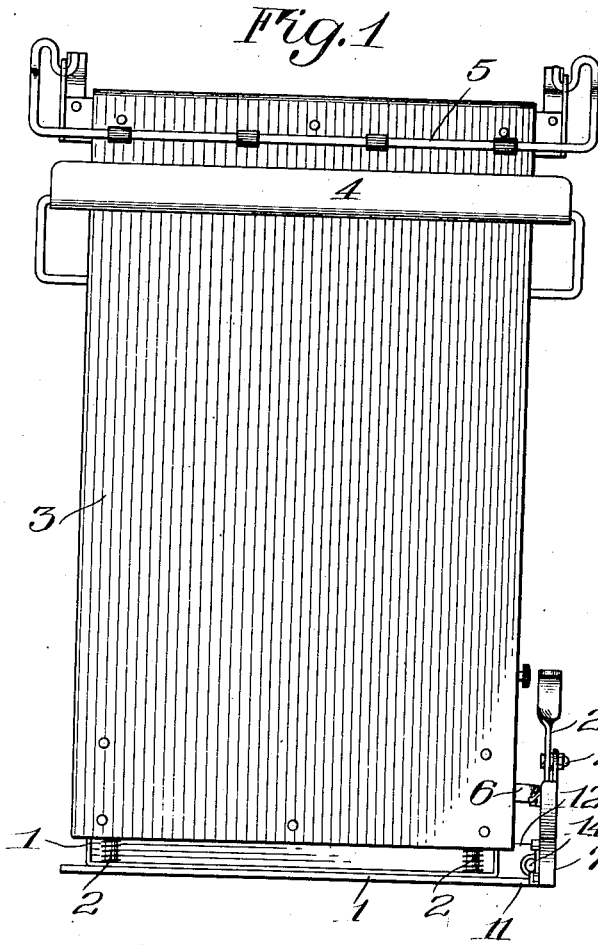
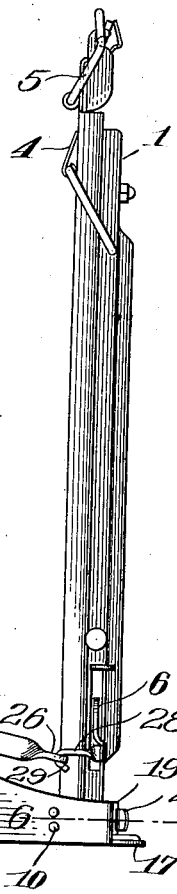
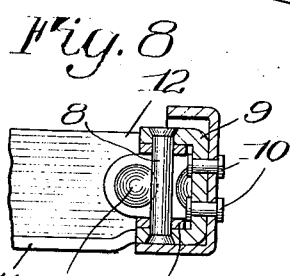
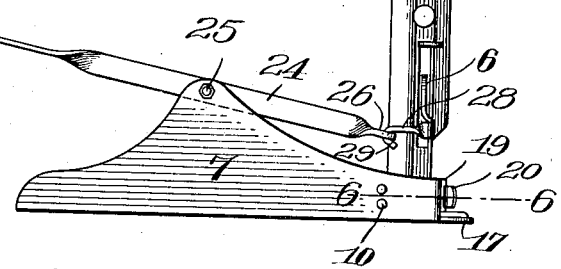
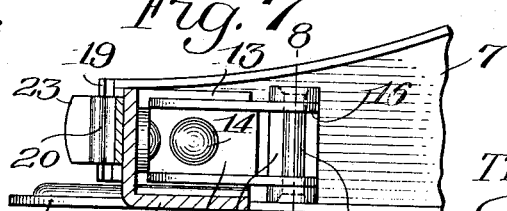
Witnesses
Nelson H. Copp
INVENTOR
Thomas H. Bishop
BY
his ATTORNEYS

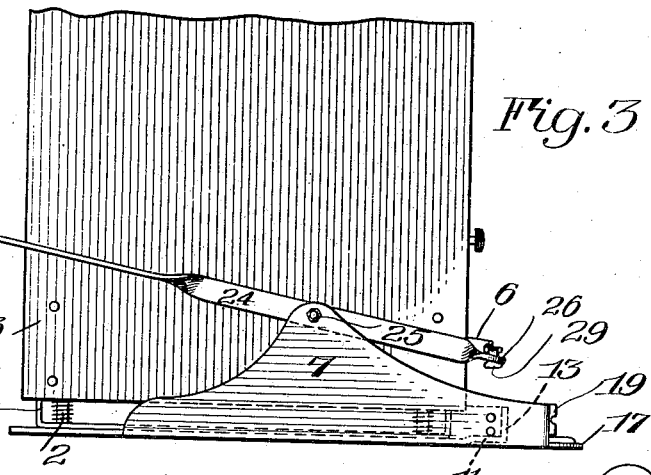
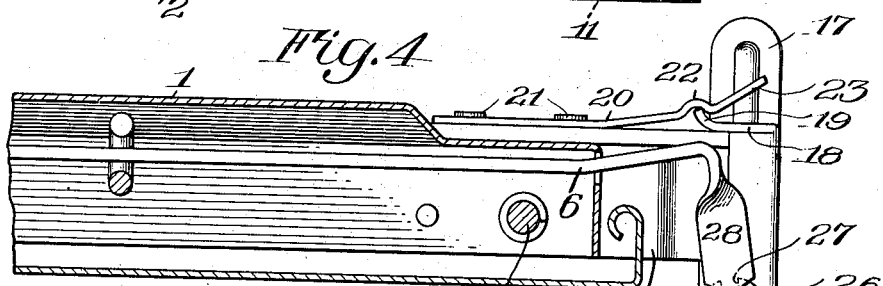
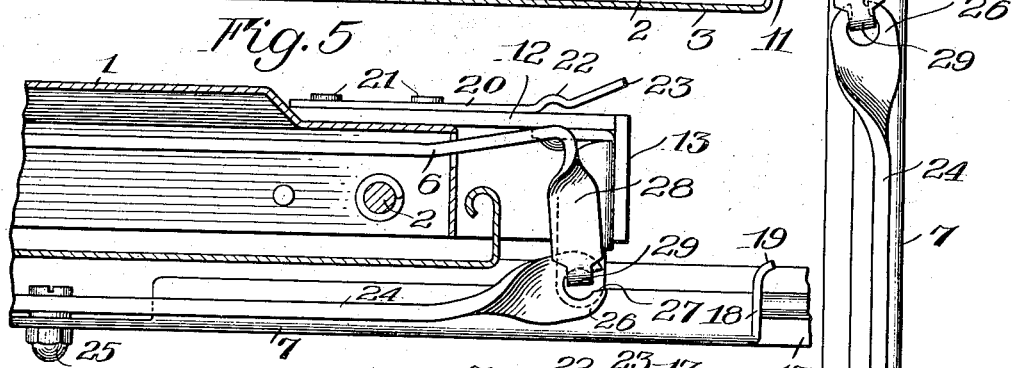
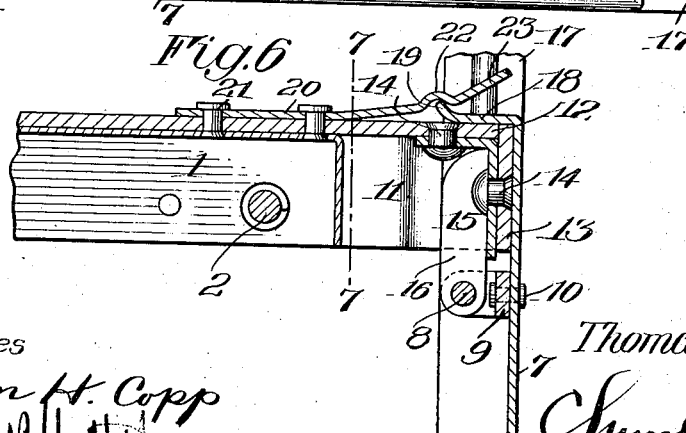

UNITED STATES PATENT OFFICE.

THOMAS H. BISHOP, OF ROCHESTER, NEW YORK, ASSIGNOR TO LINEATIME MFG. CO., INC., OF ROCHESTER, NEW YORK, A CORPORATION OF NEW YORK.

COPY-HOLDER.

1,262,626.   Specification of Letters Patent.   Patented Apr. 16, 1918.

Application filed February 16, 1917. Serial No. 148,940.

*To all whom it may concern:*

Be it known that I, THOMAS H. BISHOP, of Rochester, in the county of Monroe and State of New York, have invented certain new and useful Improvements in Copy-Holders; and I do hereby declare the following to be a full, clear, and exact description of the same, reference being had to the accompanying drawings, forming a part of this specification, and to the reference-numerals marked thereon.

My present invention relates to copy-holders of the type embodying a relatively movable copyplate and line indicator mounted upon an upright frame adapted to stand in rear of a typewriter and supported in such position by a side arm extending forwardly at the side of the machine and carrying an operating means through which the typist may indicate successive lines of her copy, and the invention has for its object to provide a simple, strong and serviceable means for connecting the operating lever to the actuating mechanism and the side arm to the frame whereby the side arm may be folded over to lie flat with the frame and copyplate when the device is not in use and occupy little space for the purposes of storage or packing. To these and other ends the invention resides in certain improvements and combinations of parts all as will be hereinafter more fully described, the novel features being pointed out in the claims at the end of the specification.

In the drawings:

Figure 1 is a front view of a copyholder constructed in accordance with and illustrating one embodiment of my invention, said copyholder being set up in operative position;

Fig. 2 is a side view;

Fig. 3 is a fragmentary front view showing the copyholder folded;

Fig. 4 is an enlarged fragmentary view partly in section through the frame and copyplate showing a top plan of the connection between the folding side arm parts and the frame parts when in normal position;

Fig. 5 is a similar view with the parts in folded position;

Fig. 6 is an enlarged fragmentary horizontal section taken substantially on the line 6—6 of Fig. 2;

Fig. 7 is a fragmentary detail section taken substantially on the line 7—7 of Fig. 6, and Fig. 8 is a detail section taken substantially on the line 8—8 of Fig. 7.

Similar reference numerals throughout the several views indicate the same parts.

The type of copyholder to which my improvements are particularly applicable is shown in the patent to R. B. Griffith, No. 1,014,646, dated January 16, 1912, but all of the working mechanism is not disclosed herein for the reason that it is unnecessary to an understanding of the present invention. Suffice it to say that a vertical back frame 1 is provided upon which moves up and down on guide rods 2 a copyplate 3 beneath a relatively fixed line indicator 4 mounted near the top of the frame 1. The copy is held on the plate 3 by a suitable clip 5 so that it will move past the line indicator 4 with the plate. The mechanism for elevating and lowering the plate may comprise a transversely extending actuating lever 6 carried on the frame 1 and in the embodiment of the said patent, movement of this lever in one direction raises the copyplate while movement in the other direction causes it to drop but as before stated, the specific character of the plate controlling mechanism is immaterial to this invention.

The back or main frame 1 is supported in an upright position by a side arm 7. In the practice of my invention, the side arm is connected to the frame by a pivot 8 carried in a bracket 9 riveted to the side arm at 10 (Figs. 6, 7 and 8) at a point removed from its rear extremity. The frame 1 has a lateral extension 11 at the right side of its base, flanged at 12 and 13 and to which flanges is secured by rivets 14 a bracket extension 15, providing forwardly projecting hinge knuckles 16 coöperating with the pintle or pivot 8. The base of the side arm 7 is extended to the rear beyond the frame 1 at 17 to form a better support but at an intermediate point the side wall of the side arm is turned inwardly as at 18 in rear of the frame and said inwardly turned portion terminates in a catch 19 that coöperates with a spring latch 20 on the back of the frame 1 to normally hold the side arm and frame in operative relationship and prevent movement on the pivot 8. The spring latch 20 is shown riveted at 21 to the frame and it has a depression 22 in which the catch 19 lodges after the spring has been displaced by contact of the catch with a deflecting portion 23 at its end as the side arm is rotated into position, the hinge 8 being rendered an elbow joint by the abutment of the side frame 7 against the flange 13 of the frame extension 11. The spring latch 20 retains the catch 19 only yieldingly and by forcing the side arm 7 laterally, it may be disengaged and the side arm folded flat across the face of the frame 1 and copyplate 3, as shown in Fig. 3. The hinge pintle or pivot 8 is offset forwardly so that the folded parts will lie flat together.

The operating member, by means of which the typist communicates motion to the actuating lever 6, is preferably in the form of a forwardly extending lever 24 pivoted at 25 to the side arm 7 to vibrate in a vertical plane so that it extends longitudinally of the side arm 7 and at right angles to the frame 1 and actuating lever 6. The rear end of the operating lever 24 is provided with an eye 26 having a narrow communicating slot 27 shown in dotted lines in Fig. 4. The free end of the actuating lever 6 is turned forwardly at 28 and a reduced portion 29 thereof is thence turned downwardly and rearwardly to form a curved pivot extending through the eye 26 on the operating lever. The said pivot is flat or oblong in cross section so that the lever 24 may be initially coupled therewith by means of the slot 27 in a manner that will be understood upon inspection so that the two levers are interlocked against vertical disengagement and though they are operating in relatively angular planes, the curved nature of the pivot 29 permits them to adapt themselves relatively to this movement. Thus, the vibration of the operating lever 24 is communicated to the actuating lever 6 and the copyplate 3 may be raised or lowered.

This coöperation of the operating and actuating levers is not disturbed by the folding of the side arm 7 to the position of Fig. 3 for the reason that I locate the curved pivot 29 directly above or in alinement with the pivot 8 so that the axis or hinge center is identical with respect to the folding movement of the side arm and frame 1, on the one hand, and the levers 6 and 24 on the other and the lever 24 is adapted to turn laterally on the pivot 29 for this folding movement as well as to slip longitudinally thereof during the normal operations.

I claim as my invention:

1. In a copyholder, the combination with a frame, a copyplate movable thereon and means carried by the frame for actuating the copyplate, of a side arm for supporting the frame hinged thereto to fold across the frame and an operating member carried by the side arm and having a pivotal connection with the actuating means adapting the said operating member to fold with the side arm.

2. In a copyholder, the combination with a frame, a copyplate movable thereon and a lever carried by the frame for actuating the copyplate, of a side arm for supporting the frame hinged thereto to fold across the frame and an operating lever pivoted to the side arm and having a pivotal connection with the actuating lever adapting the said operating lever to fold with the side arm.

3. In a copyholder, the combination with a frame, a copyplate movable thereon and a transverse lever carried by the frame for actuating the copyplate, of a side arm for supporting the frame hinged thereto to fold across the frame and an operating lever pivoted to the side arm and directly pivoted to the actuating lever on a center in alinement with the hinge center of the side arm and frame.

4. In a copyholder, the combination with a frame, a copyplate movable thereon and a transverse lever carried by the frame for actuating the copyplate, said lever having a forwardly turned and thence downwardly and rearwardly turned portion constituting a curved pivot, of a side arm for supporting the frame hinged thereto to fold across the frame on a center directly below the curved pivot of the actuating lever, and an operating lever pivoted to the side arm and having an eye receiving the curved pivot of the actuating lever adapting said operating lever to fold with the side arm while interlocked with the actuating lever.

5. In a copyholder, the combination with a frame, a copyplate movable thereon and means carried by the frame for actuating the copyplate, of a side arm for supporting the frame hinged thereto to fold across the frame, an operating member carried by the side arm and having a pivotal connection with the actuating means adapting the said operating member to fold with the side arm, and a spring latch for yieldingly holding the side arm and frame in operative position.

6. In a copyholder, the combination with a frame having a lateral and forward extension at its base, a copyplate movable thereon, and means carried by the frame for actuating the copyplate, of a side arm for supporting the frame hinged to the forward extension thereof and normally extending rearwardly along said extension and having a catch projecting in rear of the extension, said hinge adapting the side arm to fold across the frame, an operating member carried by the side arm and having a pivotal connection with the actuating means axially alined with the side arm hinge adapting the operating member to fold with the side arm, and a yielding spring latch at the back of the frame extension adapted to engage the catch on the side arm to lock the latter in operative position with relation to the frame.

THOMAS H. BISHOP.